(12) United States Patent
Winterhoff et al.

(10) Patent No.: US 9,624,813 B2
(45) Date of Patent: Apr. 18, 2017

(54) EXHAUST-GAS AFTERTREATMENT SYSTEM

(71) Applicant: MAN Truck & Bus AG, Munich (DE)

(72) Inventors: Marc Winterhoff, Nürnberg (DE); Tobias Herrmann, Nürnberg (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/522,163

(22) Filed: Oct. 23, 2014

(65) Prior Publication Data

US 2015/0121856 A1   May 7, 2015

(30) Foreign Application Priority Data

Nov. 5, 2013 (DE) .................. 10 2013 018 450

(51) Int. Cl.
| | |
|---|---|
| *F01N 11/00* | (2006.01) |
| *F01N 13/00* | (2010.01) |
| *F01N 3/20* | (2006.01) |
| *F02B 77/08* | (2006.01) |
| *G01M 15/10* | (2006.01) |

(52) U.S. Cl.
CPC ......... *F01N 13/008* (2013.01); *F01N 3/2066* (2013.01); *F01N 11/002* (2013.01); *F02B 77/086* (2013.01); *G01M 15/102* (2013.01); *F01N 2560/026* (2013.01); *F01N 2560/06* (2013.01); *Y02T 10/24* (2013.01)

(58) Field of Classification Search
CPC .............. F01N 13/008; F01N 13/0008; F01N 2560/14; F02B 77/086; F02D 41/1439
See application file for complete search history.

(56) References Cited

U.S. PATENT DOCUMENTS

| | | | | |
|---|---|---|---|---|
| 2010/0000203 A1* | 1/2010 | Kowada | ............. | B01D 46/0027 60/286 |
| 2010/0107618 A1* | 5/2010 | Kimura | ..................... | F01N 3/28 60/324 |
| 2012/0186209 A1* | 7/2012 | Ando | .................... | F01N 3/0211 55/502 |
| 2012/0305112 A1* | 12/2012 | Mitsuda | .................. | F01N 13/00 137/560 |
| 2013/0318951 A1* | 12/2013 | Nowicki | ............... | F01N 13/008 60/301 |
| 2014/0306446 A1* | 10/2014 | Kraus | ....................... | F16L 9/00 285/119 |
| 2015/0059457 A1* | 3/2015 | Niaz | ..................... | F01N 3/2892 73/114.71 |

FOREIGN PATENT DOCUMENTS

| | | | | |
|---|---|---|---|---|
| DE | 102009052332 A1 | 5/2011 | | |
| EP | 1674683 A1 | 6/2006 | | |
| EP | 2551483 A1 | 1/2013 | | |
| JP | WO 2011099527 A1 * | 8/2011 | ............. | F01N 13/00 |

\* cited by examiner

*Primary Examiner* — Jonathan Matthias
(74) *Attorney, Agent, or Firm* — Lucas & Mercanti, LLP

(57) ABSTRACT

An exhaust-gas aftertreatment system including an exhaust-gas module which has an inlet section and an outlet section. The exhaust-gas aftertreatment system has at least one sensor fastening device which comprises at least two, preferably at least three, sensor fastening means that are angularly spaced apart from one another.

16 Claims, 4 Drawing Sheets

EXHAUST-GAS AFTERTREATMENT SYSTEM

CROSS-REFERENCE TO RELATED APPLICATIONS

This application claims the priority of DE 10 2013 018 450.9 filed Nov. 5, 2013, which is incorporated herein by reference.

BACKGROUND OF THE INVENTION

The invention relates to an exhaust-gas aftertreatment system, in particular for a generator or pump unit or a vehicle, for example a motor vehicle, a utility vehicle, such as for example a bus or a heavy goods vehicle, or a ship.

Exhaust-gas aftertreatment systems having, for example, an SCR (selective catalytic reduction) module and a reducing agent module are known from the prior art. The reducing agent module serves for dispensing a reducing agent (for example urea or urea-water mixture) and for mixing the reducing agent with the exhaust gas. Also known from the prior art are exhaust-gas aftertreatment systems in which the installation angle between the SCR catalytic converter module and the reducing agent module is variable, whereby the exhaust-gas aftertreatment system can be adapted to different installation spaces, in particular different installation positions. To be able to operate exhaust-gas aftertreatment systems of this type, exhaust-gas sensors including temperature sensors and NOx sensors, are required. Installation guidelines or manufacturer specifications for temperature sensors often demand that the temperature sensors extend within an angle range of +/−90° with respect to the vehicle vertical when in an installed state. For NOx sensors, installation guidelines or manufacturer specifications often demand that the NOx sensors extend within an angle range of +/−80° with respect to the vehicle vertical. The intention of this is to prevent corrosion as a result of condensate accumulation in or on the sensors. A problem in the exhaust-gas aftertreatment systems of the prior art is that, although these can be adapted to different installation spaces, in particular different installation positions, by means of the variable installation angle, the sensors however lie outside the above-stated angle ranges in the case of some installation spaces or installation positions.

BRIEF SUMMARY OF THE INVENTION

It is an object of the invention to provide an exhaust-gas aftertreatment system, the variability of which with regard to different installation spaces and/or installation positions can be further improved.

The invention provides an exhaust-gas aftertreatment system, preferably for a vehicle, in particular a motor vehicle, a utility vehicle (for example a heavy goods vehicle or a bus) or a ship. The exhaust-gas aftertreatment system may in particular also be used on a generator or pump unit.

The exhaust-gas aftertreatment system comprises at least one exhaust-gas module, for example a catalytic converter module, a particle filter module and/or a catalytic converter/particle filter module, having an inlet section and an outlet section. Within the context of the invention, the exhaust-gas aftertreatment system thus preferably comprises, for exhaust-gas aftertreatment, at least one exhaust-gas catalytic converter and/or at least one exhaust-gas particle filter.

The exhaust-gas aftertreatment system comprises at least one sensor fastening device which is preferably in the form of a sensor ring and which is suitable for the fastening of at least one exhaust-gas sensor.

The sensor fastening device comprises at least two, preferably at least three, fastening means which are spaced apart from one another and which are suitable for the fastening of in each case one exhaust-gas sensor (measurement sensor). As exhaust-gas sensors, use is made in particular of a temperature sensor and/or a NOx sensor. The fastening means are in particular arranged so as to be spaced apart angularly from one another.

The fastening means will hereinafter be referred to as sensor fastening means. The sensor fastening means provide possible fastening options for one or more exhaust-gas sensors.

By virtue of the fact that multiple sensor fastening means are provided which are spaced apart angularly from one another, it can be ensured, or at least made more likely, that the one or more sensors extend within a desired angle range when in the actual installation state and/or in the actual installation position.

The sensor fastening means are preferably spaced apart, in particular uniformly, from one another angularly and/or in the circumferential direction for example of the sensor fastening device, of the inlet section and/or of the outlet section.

The sensor fastening means are preferably spaced apart from one another by 60°+/−15° and/or 120°+/−15°.

The sensor fastening device is preferably designed for being installed on or in the exhaust-gas aftertreatment system, for example on the inlet section and/or on the outlet section. A welded connection or clamped connection, for example, is suitable for this purpose.

The sensor fastening device preferably comprises a substantially annular (for example substantially circular or hexagonal) base element, on the circumferential surface of which the sensor fastening means are formed. The sensor fastening device is thus preferably in the form of a sensor ring.

The base element is preferably a separate component which is designed for being installed on the exhaust-gas module and/or reducing agent module. Embodiments are however likewise possible in which the sensor fastening means are, in effect, embedded directly in the exhaust-gas module and/or reducing agent module.

The sensor fastening means are preferably formed on the circumferential surface of the sensor fastening device, in particular of the sensor ring.

The sensor fastening means expediently provide a passage opening that permits exhaust-gas measurement (for example temperature measurement, or NOx measurement) by an exhaust-gas sensor.

The sensor fastening means may be designed as sensor fastening connectors.

The sensor fastening means may for example be designed for an exhaust-gas sensor to be screwed on, and may for this purpose have, for example, a threaded connection (for example an internal or external thread).

In one embodiment those sensor fastening means which do not have a sensor fastened thereto are closed in order to prevent an escape of exhaust gas.

According to another embodiment, one sensor fastening device is arranged at the inlet section and to preferably comprise at least three sensor fastening means.

In a further embodiment, one sensor fastening device is arranged at the outlet section and preferably comprises at least six sensor fastening means.

In an embodiment of the invention, the exhaust-gas aftertreatment system comprises a reducing agent module. The reducing agent module serves for dispensing the reducing agent into the exhaust gas and/or for mixing the exhaust gas with the reducing agent.

For the dispensing of the reducing agent into the exhaust gas, the reducing agent module may for example have a reducing agent feed device, in particular a reducing agent dosing device.

For the mixing of the exhaust gas with the reducing agent, the reducing agent module may for example have a reducing agent mixing device, in particular a so-called mixing path. The reducing agent mixing device may for example be provided with thermal insulation.

The reducing agent is preferably urea or a urea-water mixture.

In an embodiment of the invention, a sensor fastening device is arranged between the reducing agent module and the exhaust-gas module. It is alternatively or additionally possible for a sensor fastening device to be arranged downstream of the exhaust-gas module.

According to one embodiment of the invention, the sensor fastening device has at least one exhaust-gas temperature sensor and/or at least one exhaust-gas NOx sensor.

The sensor fastening device at the inlet section and/or upstream of the exhaust-gas module may for example have an exhaust-gas temperature sensor.

The sensor fastening device at the outlet section and/or downstream of the exhaust-gas module may for example have an exhaust-gas temperature sensor and/or an exhaust-gas NOx sensor.

In a further embodiment, the exhaust-gas aftertreatment system comprises a device (for example an electronic plate) with evaluation electronics, which device serves for connecting to at least one exhaust-gas sensor that is fastened in a sensor fastening means. The device is preferably arranged in displaceable fashion on the exhaust-gas aftertreatment system, for example so as to be displaceable along the circumferential surface of the exhaust-gas module, so that the device can be fixed in different angular positions relative to the exhaust-gas module.

The exhaust-gas aftertreatment system is preferably of modular construction and, as already mentioned above, preferably comprises a reducing agent module and an exhaust-gas module. The installation angle between the reducing agent module and the exhaust-gas module is preferably variable. It is likewise possible for the installation angle of the exhaust-gas module to be variable. Through the provision of a variable installation angle, it can be ensured that the exhaust-gas aftertreatment system can be adapted to different installation spaces and/or different installation positions.

The exhaust-gas module may comprise, for example, a catalytic converter, an SCR catalytic converter, preferably with, for example, an ammonia barrier catalytic converter, an oxidation catalytic converter and/or a particle filter. The particle filter is preferably a diesel particle filter.

The exhaust-gas module may consequently be referred to in particular as catalytic converter module, SCR catalytic converter module, oxidation catalytic converter module, particle filter module and/or catalytic converter-particle filter module.

Within the context of the invention, the features "sensor fastening device" and "sensor fastening means" should expediently be interpreted as being suitable for the fastening of at least one exhaust-gas sensor. Within the context of the invention, it is possible but not imperatively necessary for at least one exhaust-gas sensor to actually be fastened by means of the latter features.

It should be mentioned in particular that, by virtue of the fact that an exhaust-gas sensor can be installed at different angular positions by way of the sensor fastening means, the sensor fastening means provide angularly different fastening options and it can be ensured, or at least made more likely, that a desired sensor angle position, or for example a sensor angle position demanded in accordance with installation guidelines or manufacturer specifications, can be adhered to. In this way, it is possible in particular for corrosion as a result of condensate accumulation on or in the sensors to be prevented.

It should also be mentioned that the sensor fastening device is preferably arranged in a rotationally fixed manner on or in the exhaust-gas aftertreatment system, Said fastening device may be either fixedly welded and/or fixed for example by a clamp.

It should furthermore be mentioned that the sensor fastening device may comprise at least four, at least five, or even at least six sensor fastening means.

It should additionally be mentioned that the sensor fastening means may be designed differently, for example on the one hand for the fastening of a first sensor type (for example temperature sensor) and on the other hand for the fastening of a second sensor type (for example NOx sensor).

In one preferred embodiment, the sensor fastening device has five sensor fastening means, wherein these are configured in two groups. A first group composed of three sensor fastening means serves for the fastening of NOx sensors, and a second group composed of two sensor fastening means serves for the fastening of temperature sensors. The two sensor fastening means for the temperature sensors are arranged diametrically oppositely on the sensor fastening device of annular form, or with a 180° offset with respect to one another on the annular sensor fastening device. By contrast, the first group of the three sensor fastening means for the NOx sensors are offset with respect to one another by 120°. In this way, a sensor arrangement is obtained which satisfies both the requirements of the temperature sensors and also those of the NOx sensors and which requires the least possible material and manufacturing outlay for the sensor fastening means. The five sensor fastening means are particularly preferably arranged on the annular sensor fastening device with point symmetry about the centre of the annular sensor fastening device.

The invention is not restricted to an exhaust-gas aftertreatment system but also encompasses a vehicle (for example a motor vehicle, a utility vehicle (for example a heavy goods vehicle or a bus), or a ship) having an exhaust-gas aftertreatment system as described herein.

The preferred embodiments and features of the invention described above may be combined with one another as desired. Other advantageous refinements of the invention are disclosed in the subclaims or emerge from the following description of preferred embodiments of the invention in conjunction with the appended figures.

DETAILED DESCRIPTION OF THE PREFERRED EMBODIMENTS

Figure 1:
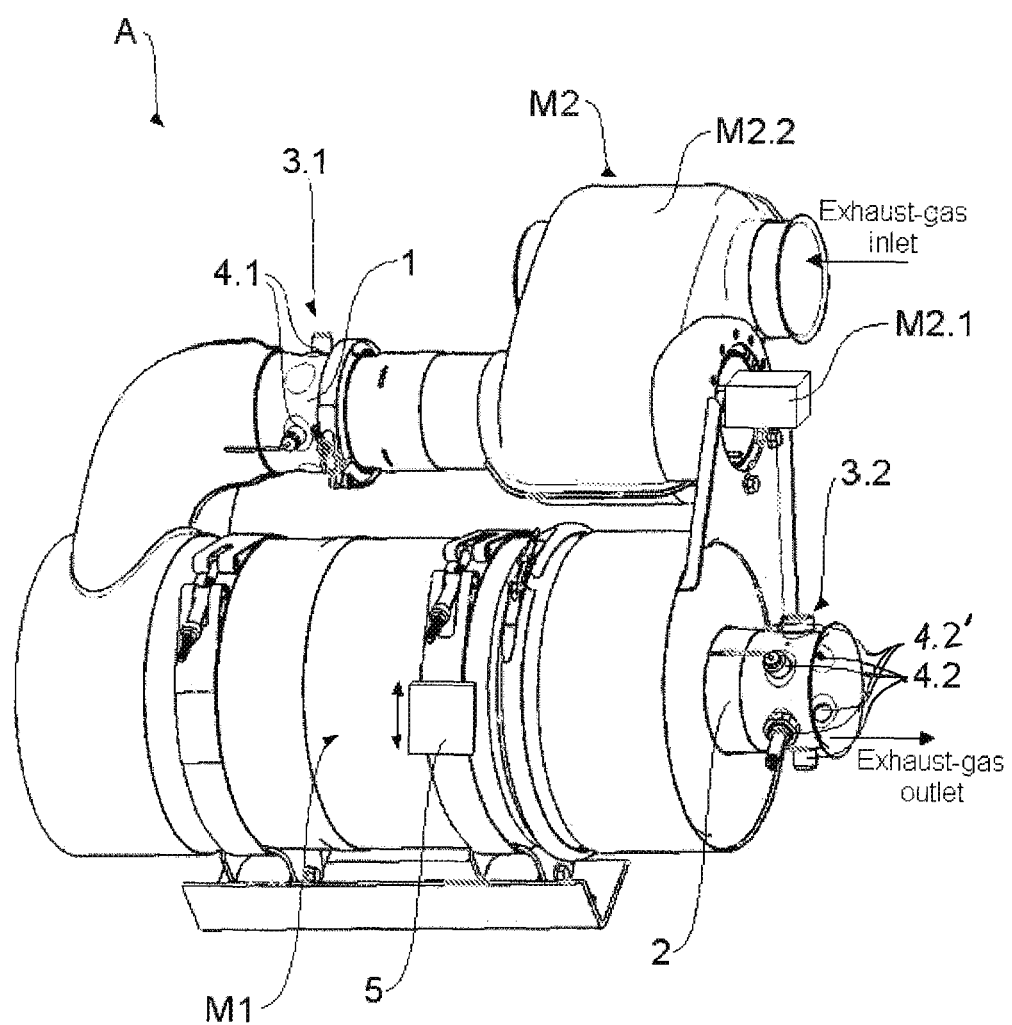
FIG. 1 shows a perspective view of an exhaust-gas aftertreatment system according to one embodiment of the invention.

FIG. 1 shows a perspective view of an exhaust-gas aftertreatment system A for a vehicle according to one embodiment of the invention.

The exhaust-gas aftertreatment system A comprises an exhaust-gas module M1, in particular an SCR (selective catalytic reduction) catalytic converter module, and a reducing agent module M2. The exhaust-gas module M1 will hereinafter be referred to as catalytic converter module M1. The reducing agent module M2 comprises a schematically illustrated reducing agent dispensing device M2.1 (for example a reducing agent dosing device) for dispensing the reducing agent into the exhaust gas, and a mixing device M2.2 (for example a mixing path) for mixing the exhaust gas with the reducing agent. The reducing agent is preferably urea or a urea-water mixture. The catalytic converter module M1 and the reducing agent module M2 are connected to one another by means of flange connections.

The catalytic converter module M1 comprises an inlet section 1 and an outlet section 2. It is normally the case that only an exhaust-gas temperature sensor for exhaust-gas temperature measurement is required at the inlet section 1, whereas it is normally the case that an exhaust-gas temperature sensor for exhaust-gas temperature measurement and an exhaust-gas NOx sensor for exhaust-gas NOx measurement are required at the outlet section 2.

An expediently annular sensor fastening device 3.1, which comprises three sensor fastening means or fasteners 4.1 that are spaced apart from one another, is arranged at the inlet section 1 of the catalytic converter module M1. The sensor fastening means 4.1 provide three possible fixing positions, in particular for a temperature sensor.

The sensor fastening means 4.1 are uniformly spaced apart from one another by 120° in the circumferential direction of the sensor fastening device 3.1.

Depending on the installation position of the exhaust-gas aftertreatment system A, at least one sensor fastening means 4.1 is in a desired angle range of normally +/−90° with respect to the vehicle vertical, if this is to be used for an exhaust-gas temperature sensor. The sensor should be fastened in or on that sensor fastening means 4.1 which falls within the desired angle range. The other sensor fastening means 4.1 remain without a sensor, but are closed off in order to prevent an escape of exhaust gas.

Depending on the application, the sensor fastening device 3.1 may be provided with more than three sensor fastening means 4.1.

An expediently annular sensor fastening device 3.2, which comprises six sensor fastening means 4.2 that are spaced apart from one another, is arranged at the outlet section 2 of the catalytic converter module M1.

A first group of three sensor fastening means 4.2 are designed for the fastening of a first sensor type (for example temperature sensor) and, for this purpose, provide three possible fixing positions. The sensor fastening means 4.2 are uniformly spaced apart from one another by 120° in the circumferential direction of the sensor fastening device 3.2.

A second group of three sensor fastening means 4.2' are designed for the fastening of a second sensor type (for example exhaust-gas NOx sensor) and, for this purpose, provide three possible fixing positions. The sensor fastening means 4.2 are uniformly spaced apart from one another by 120° in the circumferential direction of the sensor fastening device 3.2.

The sensor fastening means 4.2 for the fastening of the first sensor type and the sensor fastening means 4.2' for the fastening of the second sensor type are designed differently.

The sensor fastening means 4.2 for the fastening of the first sensor type are spaced apart by 60° from the sensor fastening means 4.2' for the fastening of the second sensor type as viewed in the circumferential direction of the sensor fastening device 3.2.

Depending on the installation position of the exhaust-gas aftertreatment system A, at least one sensor fastening means 4.2 lies in a desired angle range of normally +/−90° with respect to the vehicle vertical, if this is to be used for an exhaust-gas temperature sensor. Depending on the installation position of the exhaust-gas aftertreatment system A, at least one sensor fastening means 4.2' lies in a desired angle range of normally +/−80° with respect to the vehicle vertical, if this is to be used for a NOx sensor. The temperature sensor and the NOx sensor should be fastened in or on that sensor fastening means 4.2, 4.2' which falls within the desired angle range. The other sensor fastening means 4.2, 4.2' remain without sensors, but are closed off in order to prevent an escape of exhaust gas.

Depending on the application, the sensor fastening device 3.2 may be provided with more or fewer than three sensor fastening means 4.2 or 4.2', for each of first sensor type and the second sensor type.

The exhaust-gas aftertreatment system A furthermore comprises a schematically illustrated device 5, for example a so-called electronic plate, with evaluation electronics, which device serves for connecting to at least one exhaust-gas sensor that is fastened on or in the sensor fastening means 4.1, 4.2, 4.2'. The device 5 is designed to be displaceable, in particular is arranged so as to be displaceable on the catalytic converter module M1, in order to be positioned in different angular positions, as is schematically indicated in FIG. 1 by the double arrow.

Figure 2:
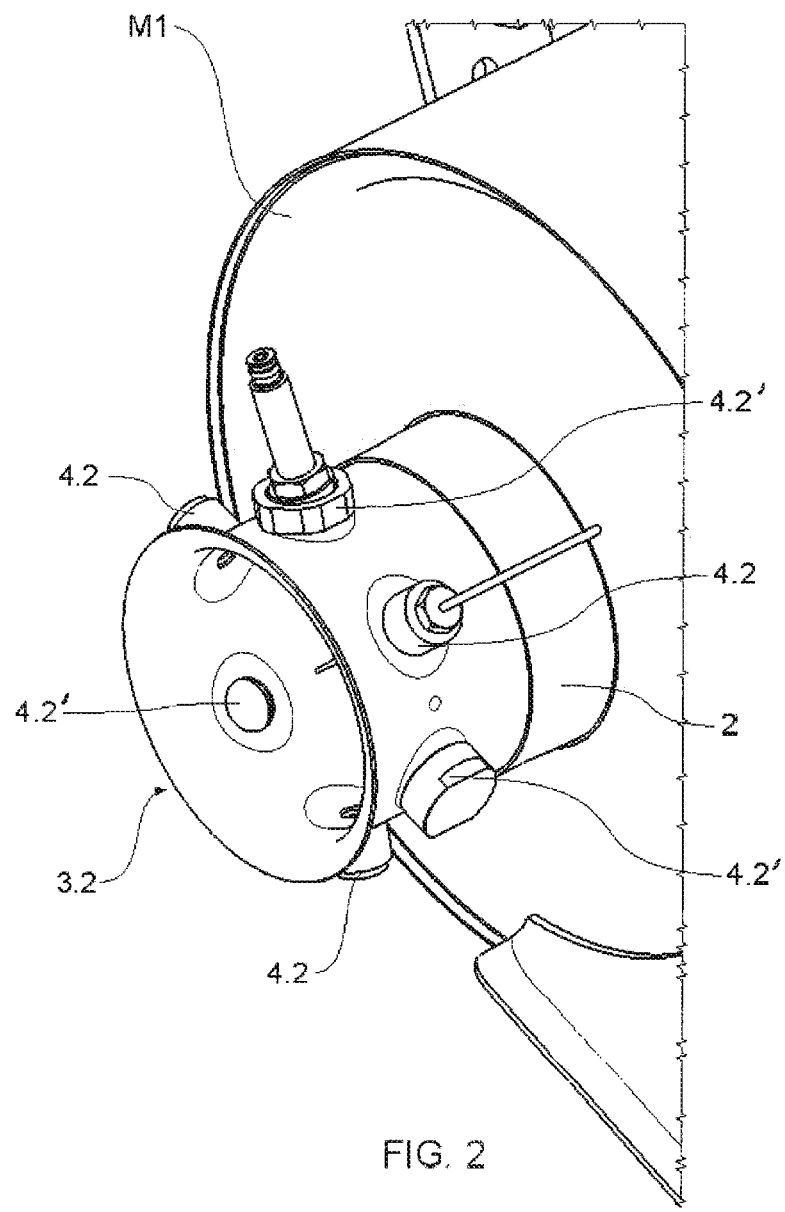
FIG. 2 shows a perspective, enlarged view of a part of the exhaust gas aftertreatment system of FIG. 1.

FIG. 2 shows an enlarged view of the sensor fastening device 3.2 with the sensor fastening means 4.2, 4.2'. FIG. 2 shows in particular that the sensor fastening means 4.2, 4.2' are designed as a sensor fastening connector with an internal thread (not visible) for enabling the exhaust-gas sensors to be screwed on. FIG. 2 also shows that the sensor fastening device 3.2 is designed as a sensor ring, this also being true of the sensor fastening device 3.1.

Figure 3:
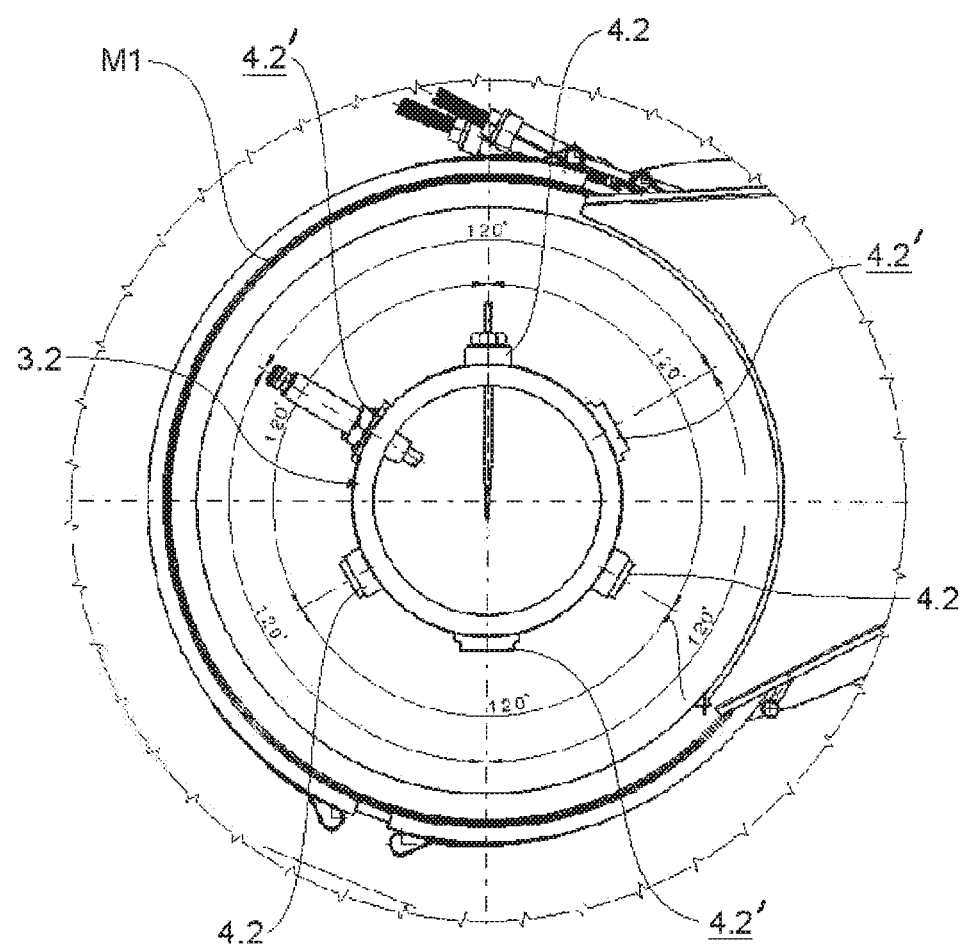
FIG. 3 shows a front view of a part of the exhaust-gas aftertreatment system of FIGS. 1 and 2.

FIG. 3 shows a front view of the sensor fastening device 3.2 at the outlet section 2. FIG. 3 shows in particular that the sensor fastening device 3.2 comprises three sensor fastening means 4.2 for a first sensor type and three sensor fastening means 4.2' for a second sensor type.

The sensor fastening means 4.2 for the first sensor type are spaced apart from one another by 120° in the circumferential direction. The sensor fastening means 4.2' for the second sensor type are likewise spaced apart from one another by 120° in the circumferential direction. The sensor fastening means 4.2 for the first sensor type and the sensor fastening means 4.2' for the second sensor type are spaced apart from one another by 60° in the circumferential direction.

Figure 4:
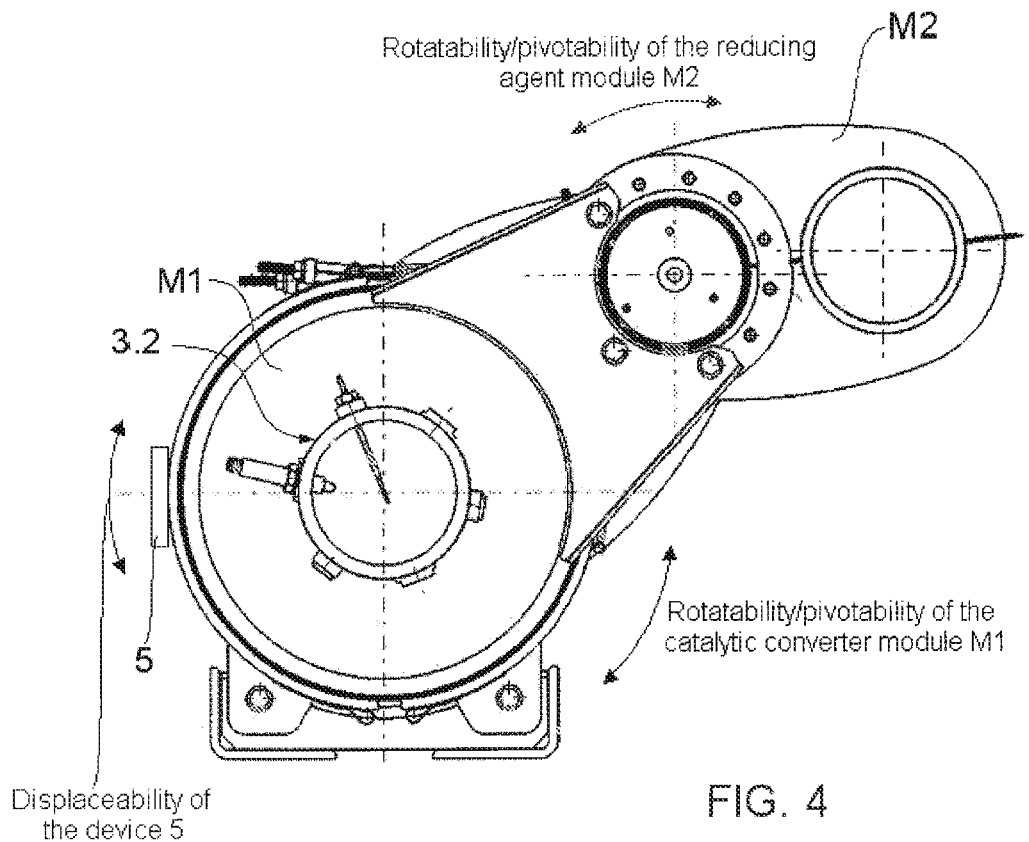
FIG. 4 shows a front view of the exhaust-gas aftertreatment system of FIGS. 1 to 3.

FIG. 4 shows a front view of the exhaust-gas aftertreatment system A from FIGS. 1 to 3. The double arrows shown in FIG. 4 illustrate degrees of freedom of movement, in particular degrees of freedom of rotational or pivoting movement, of the catalytic converter module M1 and of the reducing agent module M2. It follows from this that the installation angle between the catalytic converter module M1 and the reducing agent module M2 is variable, whereby the exhaust-gas aftertreatment system A can be adapted to different installation spaces and/or different installation positions. The double arrow assigned to the device 5 illustrates the degree of freedom of displacement of the device 5.

Figure 5:
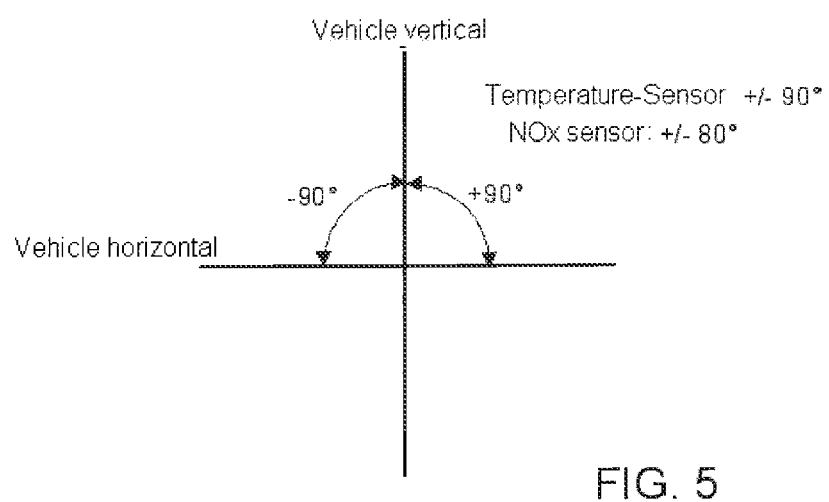
FIG. 5 shows angular installation ranges for exhaust-gas sensors.

FIG. 5 serves to illustrate desired installation angles, or installation angles that are admissible in accordance with installation guidelines or manufacturer specifications, for temperature sensors and NOx sensors. Temperature sensors should normally extend in an angle range of +/−90° with respect to the vehicle vertical, whereas NOx sensors should normally extend in an angle range of +/−80° with respect to the vehicle vertical.

By virtue of the fact that exhaust-gas sensors can be installed in different angular positions by way of the sensor fastening means 4.1, 4.2, 4.2' or in other words the sensor fastening means 4.1, 4.2, 4.2' provide angularly different fastening options for the exhaust-gas sensors, it can be ensured that desired or sensor positions can be adhered to. In this way, it is possible in particular for corrosion as a result of condensate accumulation on or in the exhaust-gas sensors to be prevented.

The exhaust-gas aftertreatment system A, which comprises at least one catalytic converter module M1, can thus be installed in any desired positions because, by means of the at least one sensor fastening device 3.1, 3.2, it is possible for installation guidelines, manufacturer specifications or even simply installation wishes with regard to exhaust-gas sensors to be adhered to regardless of the installation position of the exhaust-gas aftertreatment system A, in particular because three possible fixing positions are provided per exhaust-gas sensor, wherein, depending on the installation position after the installation of the exhaust-gas aftertreatment system A, a fixing position that is then suitable can be selected for the fastening of the exhaust-gas sensor.

It should be mentioned that the exhaust-gas module M1 may not only be designed as an SCR catalytic converter module but may alternatively or additionally comprise in particular a particle filter and/or some other catalytic converter, for example an oxidation catalytic converter, for exhaust-gas aftertreatment purposes. Therefore, within the context of the invention, "exhaust-gas aftertreatment" preferably encompasses catalytic converter-based exhaust-gas aftertreatment and/or filter-based exhaust-gas aftertreatment.

The invention is not restricted to the preferred embodiments described above. Rather, numerous variants and modifications are possible which likewise make use of the inventive concept and which thus fall within the scope of protection. Furthermore, the invention also claims protection for the subject matter and the features of the subclaims independently of the features and claims referred back to.

LIST OF REFERENCE SIGNS

1 Inlet section
2 Outlet section
3.1 Sensor fastening device
3.2 Sensor fastening device
4.1 Fastening means for sensor fastening
4.2 Fastening means for sensor fastening
5 Device with evaluation electronics
A Exhaust-gas aftertreatment system
M1 Exhaust-gas module
M2 Reducing agent module
M2.1 Reducing agent supply/discharge device
M2.2 Reducing agent mixing device (mixing path)

The invention claimed is:

1. An exhaust-gas aftertreatment system, comprising:
   at least one exhaust-gas module with an inlet section and an outlet section,
   a first exhaust-gas sensor, and
   a first sensor fastening device arranged at the inlet section and a second sensor fastening device arranged at the outlet section,
   the first sensor fastening device having an annular base element with a circumferential surface and at least two identical spaced-apart fasteners formed on the circumferential surface and providing at least two fixing positions for the first exhaust-gas sensor, whereby the first exhaust-gas sensor is connectable to any of the at least two identical spaced-apart fasteners making it more likely that the first exhaust gas sensor extends within a desired angular range in an installed state of the at least one exhaust-gas module,
   the second sensor fastening device also having an annular base element with a circumferential surface and at least two identical spaced-apart fasteners formed on the circumferential surface and providing at least two fixing positions for another first exhaust-gas sensor.

2. The exhaust-gas aftertreatment system according to claim 1, wherein the exhaust-gas aftertreatment system is of modular construction for one of a vehicle, a pump, or a generator unit.

3. The exhaust-gas aftertreatment system according to claim 1, wherein the at least two identical spaced-apart fasteners of each of the first and second sensor fastening devices are spaced apart from one another in a circumferential direction or angularly.

4. The exhaust-gas aftertreatment system according to claim 3, wherein the at least two identical spaced-apart fasteners of each of the first and second sensor fastening devices are spaced apart from one another by one of 80°+/−15° and 120°+/−15°.

5. The exhaust-gas aftertreatment system according to claim 1, wherein each of the at least two identical spaced-apart fasteners of each of the first and second sensor fastening devices provide a passage opening in each of the first and second sensor fastening devices that permits exhaust-gas measurement by the first exhaust-gas sensor.

6. The exhaust-gas aftertreatment system according to claim 1, wherein each of the at least two identical spaced-apart fasteners of each of the first and second sensor fastening devices comprise sensor fastening connectors.

7. The exhaust-gas aftertreatment system according to claim 1, wherein each of the at least two identical spaced-apart fasteners of the first sensor fastening device is a threaded fastener in which the first exhaust-gas sensor can be threadably screwed.

8. The exhaust-gas after-treatment system according to claim 1, wherein at least one of the at least two identical spaced-apart fasteners of the first sensor fastening device without the first exhaust-gas sensor is closed in order to prevent an escape of exhaust gas.

9. The exhaust-gas aftertreatment system according to claim 1, further comprising a reducing agent module arranged upstream of the at least one exhaust-gas module, wherein the first sensor fastening device is arranged between the exhaust-gas module and the reducing agent module.

10. The exhaust-gas aftertreatment system according to claim 1, wherein the first exhaust-gas sensor is one of a temperature sensor and an NOx sensor.

11. The exhaust-gas aftertreatment system according to claim 1, further comprising a reducing agent module, and the installation angle between the exhaust-gas module and the reducing agent module is variable.

12. The exhaust-gas aftertreatment system according to claim 1, wherein the exhaust-gas module comprises at least one of the following:
   a catalytic converter,
   an SCR catalytic converter,
   an oxidation catalytic converter,
   a particle filter.

13. The exhaust-gas aftertreatment system according to claim 1, wherein the first exhaust-gas sensor is a temperature sensor and the exhaust-gas after treatment system further comprises an NOx sensor, and the at least two identical spaced-apart fasteners of the second sensor fastening device are first fasteners and the second sensor fastening device further comprises at least an additional two identical second fasteners, the first fasteners having a different configuration from the second fasteners, the first fasteners providing at least two fixing positions for the temperature sensor and the second fasteners providing at least two fixing positions for the NOx sensor.

14. A vehicle having an exhaust-gas aftertreatment system according to claim 1.

15. The exhaust-gas aftertreatment system according to claim 1, further comprising a second exhaust-gas sensor, wherein the at least two identical spaced-apart fasteners on the second sensor fastening device are three identical first fasteners and the second sensor fastening device further comprises at least an additional two identical second fasteners, the first fasteners having a different configuration from the second fasteners, the three identical first fasteners are offset with respect to each other by 120° providing three fixing positions for the first exhaust-gas sensor, and the at least two identical second fasteners are offset from each other by at least 120° providing two fixing positions for the second exhaust-gas sensor.

16. The exhaust-gas aftertreatment system according to claim 15, wherein the first exhaust-gas sensor is an NOx sensor and the second exhaust-gas sensor is a temperature sensor.

* * * * *